United States Patent
Zhang et al.

(10) Patent No.: US 11,102,738 B2
(45) Date of Patent: Aug. 24, 2021

(54) SYNCHRONIZATION SIGNAL DESIGN FOR UNLICENSED SPECTRUM ACCESS USING CELLULAR COMMUNICATIONS

(71) Applicant: Apple Inc., Cupertino, CA (US)

(72) Inventors: Wei Zhang, Santa Clara, CA (US); Wei Zeng, San Diego, CA (US); Tianyan Pu, Cupertino, CA (US); Haitong Sun, Irvine, CA (US); Jia Tang, San Jose, CA (US); Dawei Zhang, Saratoga, CA (US); Sami M. Almalfouh, San Jose, CA (US); Zhu Ji, San Jose, CA (US); Johnson O. Sebeni, Fremont, CA (US)

(73) Assignee: Apple Inc., Cupertino, CA (US)

(*) Notice: Subject to any disclaimer, the term of this patent is extended or adjusted under 35 U.S.C. 154(b) by 14 days.

(21) Appl. No.: 16/373,504

(22) Filed: Apr. 2, 2019

(65) Prior Publication Data

US 2019/0313350 A1    Oct. 10, 2019

Related U.S. Application Data

(60) Provisional application No. 62/654,114, filed on Apr. 6, 2018.

(51) Int. Cl.
*H04J 3/06*     (2006.01)
*H04W 56/00*    (2009.01)
(Continued)

(52) U.S. Cl.
CPC ......... *H04W 56/001* (2013.01); *H04W 16/14* (2013.01); *H04W 72/12* (2013.01)

(58) Field of Classification Search
None
See application file for complete search history.

(56) References Cited

U.S. PATENT DOCUMENTS

| 10,231,208 B2 * | 3/2019 | Agiwal | H04W 68/025 |
| 2018/0234156 A1 * | 8/2018 | Tsai | H04B 7/0695 |

(Continued)

FOREIGN PATENT DOCUMENTS

| WO | WO 2017/210326 A1 | 12/2017 | |
| WO | WO-2017210326 A1 * | 12/2017 | H04L 1/08 |

OTHER PUBLICATIONS

Mediatekic Inc, Considerations on intial access in NR unlicensed bands Feb. 17, 2018, 3GPP Draft R1-1801658, vol. RANWG1 Meeting #92, pp. 1 & 2 (Year: 2018).*

(Continued)

*Primary Examiner* — Gerald A Smarth
(74) *Attorney, Agent, or Firm* — Kowert, Hood, Munyon, Rankin & Goetzel, P.C.

(57) ABSTRACT

Apparatuses, systems, and methods for performing timing synchronization between a base station and a user equipment device within an unlicensed spectrum band. In some scenarios, beamforming tracking may also be performed. Upon determining that a transmission medium within the unlicensed spectrum band is available for transmission, a base station may transmit a plurality of synchronization signal blocks (SSBs), or a plurality of copies of one SSB, with associated remaining minimum system information (RMSI) blocks, within a single time instance within a SSB burst window. The SSBs may be transmitted at different frequency positions and according to distinct beamforming configurations. The SSBs and RMSI blocks may be configured such that a receiving user equipment device may determine the time-domain, and optionally the frequency-domain, position of the SSB and RMSI within the SSB burst window, to allow timing synchronization and optionally beamforming tracking.

17 Claims, 7 Drawing Sheets

(51) Int. Cl.
*H04W 16/14* (2009.01)
*H04W 72/12* (2009.01)

(56) References Cited

U.S. PATENT DOCUMENTS

| | | | |
|---|---|---|---|
| 2018/0279380 A1 | 9/2018 | Jung | |
| 2018/0287840 A1* | 10/2018 | Akkarakaran | H04L 27/262 |
| 2018/0317212 A1 | 11/2018 | Kazmi | |
| 2018/0323850 A1* | 11/2018 | Baligh | H04L 5/0094 |
| 2018/0324728 A1 | 11/2018 | Abedini | |
| 2019/0037481 A1 | 1/2019 | Zhang | |
| 2019/0306832 A1* | 10/2019 | Si | H04L 27/2666 |
| 2019/0364599 A1* | 11/2019 | Islam | H04L 5/0053 |
| 2020/0092843 A1* | 3/2020 | Yang | H04W 68/005 |
| 2020/0146095 A1* | 5/2020 | Hsieh | H04W 76/28 |
| 2020/0205095 A1* | 6/2020 | Strom | H04J 11/0076 |
| 2020/0228275 A1* | 7/2020 | Li | H04W 56/0025 |
| 2020/0413359 A1* | 12/2020 | Li | H04W 74/0808 |

OTHER PUBLICATIONS

Mediatek Inc.; "Considerations on initial access in NR unlicensed bands"; 3GPP Draft, R1-1801658; vol. RAN WG1 Meeting #92, No. Athens, Greece; Feb. 17, 2018; four pages.

ZTE Corporation et al; "Association of Monitoring windows for paging with SSB"; 3GPP Draft, R2-1804456; vol. RAN WG2 Meeting #101 bis, No. Sanya, China; Apr. 5, 2018; six pages.

Vivo; "Remaining issues for SSB design"; 3GPP Draft, R1-1717456; vol. RAN WG1 Meeting #90 bis, No. Prague, Czech Republic; Oct. 8, 2017; six pages.

ZTE et al; "Remaining details of RACH procedure"; 3GPP Draft, R1-1719346; vol. RAN WG1 Meeting #91, No. Reno, USA; Nov. 18, 2017; 30 pages.

International Search Report and Written Opinion, Application No. PCT/US2019/026001, dated Jun. 14, 2019, 19 pages.

International Preliminary Report on Patentability, Application No. PCT/US2019/026001, dated Oct. 15, 2020; 11 pages.

* cited by examiner

SYNCHRONIZATION SIGNAL DESIGN FOR UNLICENSED SPECTRUM ACCESS USING CELLULAR COMMUNICATIONS

PRIORITY CLAIM

This application claims benefit of priority of U.S. provisional application Ser. No. 62/654,114, titled "Synchronization Signal Design for Unlicensed Spectrum Access Using Cellular Communications", filed Apr. 6, 2018, whose inventors are Wei Zhang et al., which is hereby incorporated by reference in its entirety as though fully and completely set forth herein.

FIELD

The present application relates to wireless devices, and more particularly to apparatus, systems, and methods for synchronizing cellular communications, such as 3GPP 5G-NR communications, in unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for use of unlicensed spectrum bands —i.e. portions of the RF spectrum not expressly licensed for use by a cellular communication provider, such as the unlicensed 5 GHz band and the unlicensed 60 GHz band.

Additionally, there exist numerous other different wireless communication technologies and standards, some of which may compete for spectrum access within unlicensed spectrum bands. Some examples of wireless communication standards in addition to those mentioned above include GSM, UMTS (WCDMA, TDS-CDMA), LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

Consequently, efforts are being made in ongoing developments of 5G-NR to allow effective use of unlicensed spectrum.

SUMMARY

Embodiments relate to apparatuses, systems, and methods for performing timing synchronization and beamforming tracking in standalone access to unlicensed spectrum.

In some scenarios, upon determining that a transmission medium within the unlicensed spectrum band is available for transmission, a base station may transmit a plurality of synchronization signal blocks (SSBs), or a plurality of copies of one SSB, with associated remaining minimum system information (RMSI) blocks, within a single time instance within a SSB burst window. The SSBs may be transmitted at different frequency positions and according to distinct beamforming configurations. The SSBs and RMSI blocks may be configured such that a receiving user equipment device may determine the time-domain, and optionally the frequency-domain, position of the SSB and RMSI within the SSB burst window, to allow timing synchronization and optionally beamforming tracking.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
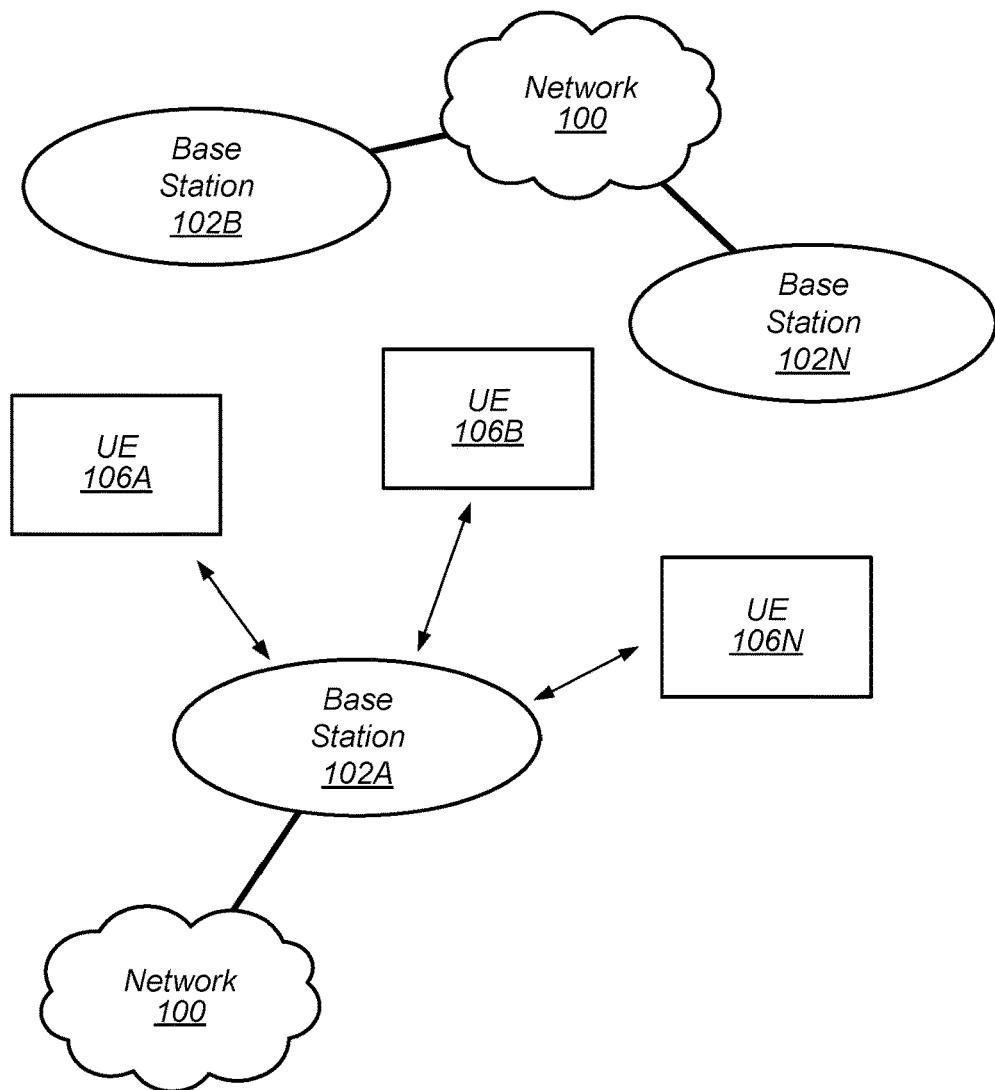
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
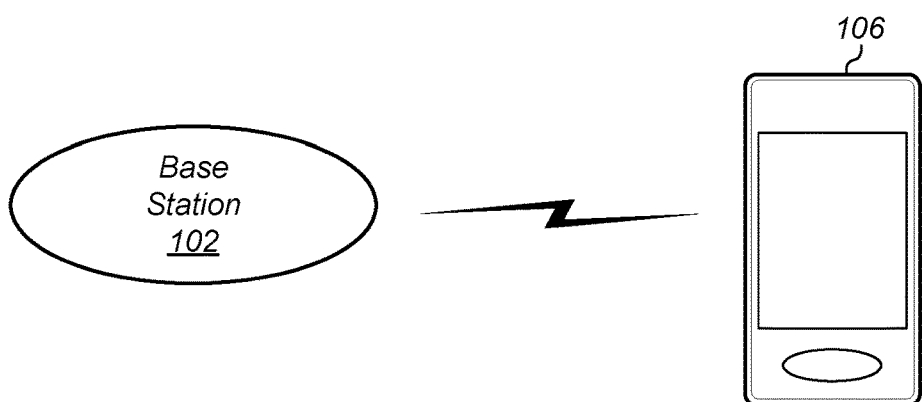
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G-NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G-NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G-NR) base station, or "gNB". In some embodiments, a gNB may be connected to a legacy evolved packet core (EPC) network and/or to a NR core (NRC) network. In addition, a gNB cell may include one or more transmission and reception points (TRPs), which may include an antenna panel (i.e., a panel containing one or more arrays of antenna elements). In addition, a UE capable of operating according to 5G-NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G-NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G-NR (or LTE or 1×RTT or LTE or GSM), and separate radios for communicating using each of Wi-Fi and Bluetooth. Other configurations are also possible.

Figure 3:
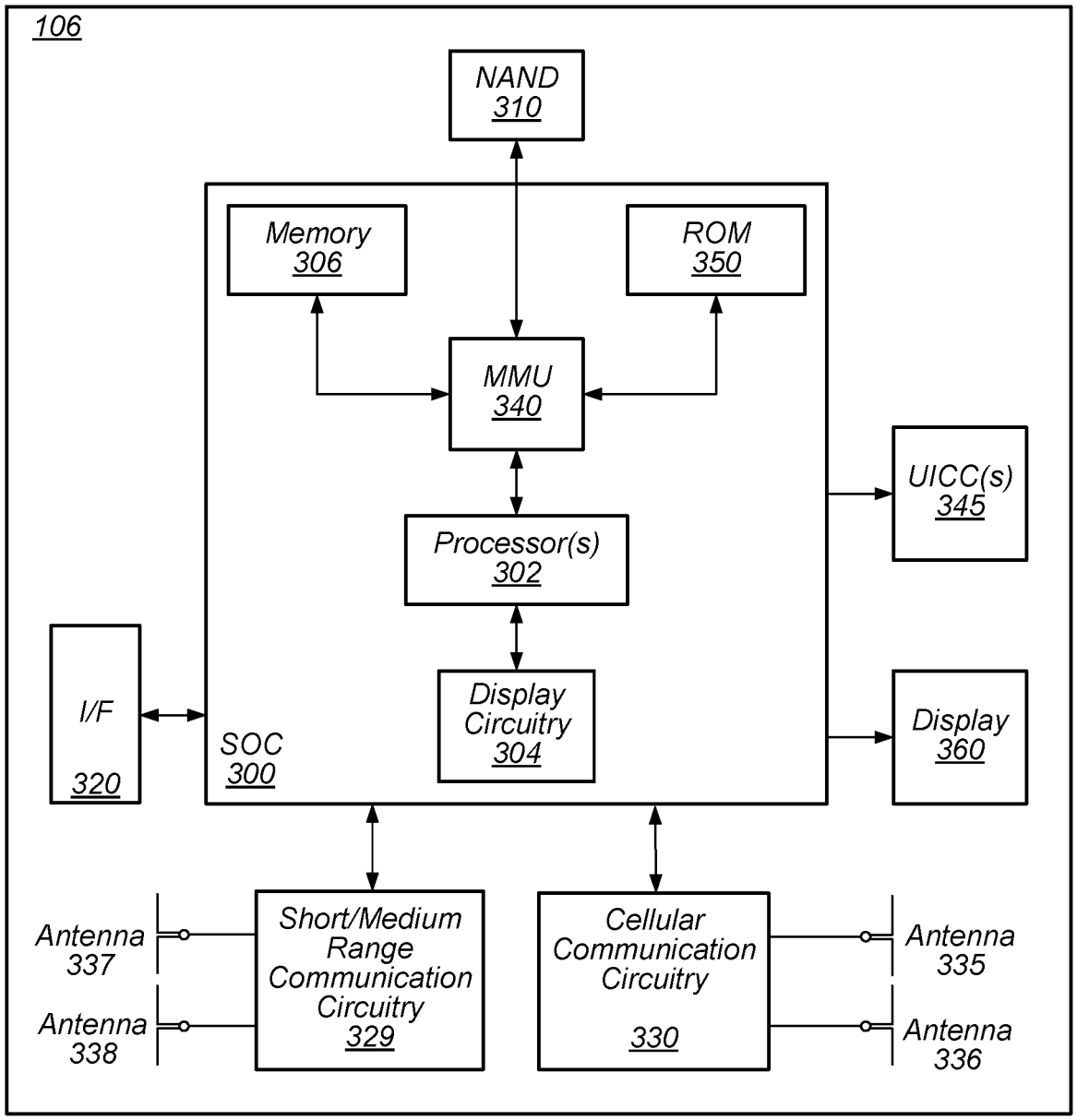
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface (I/F) such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G-NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G-NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G-NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method as disclosed below.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and/or short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
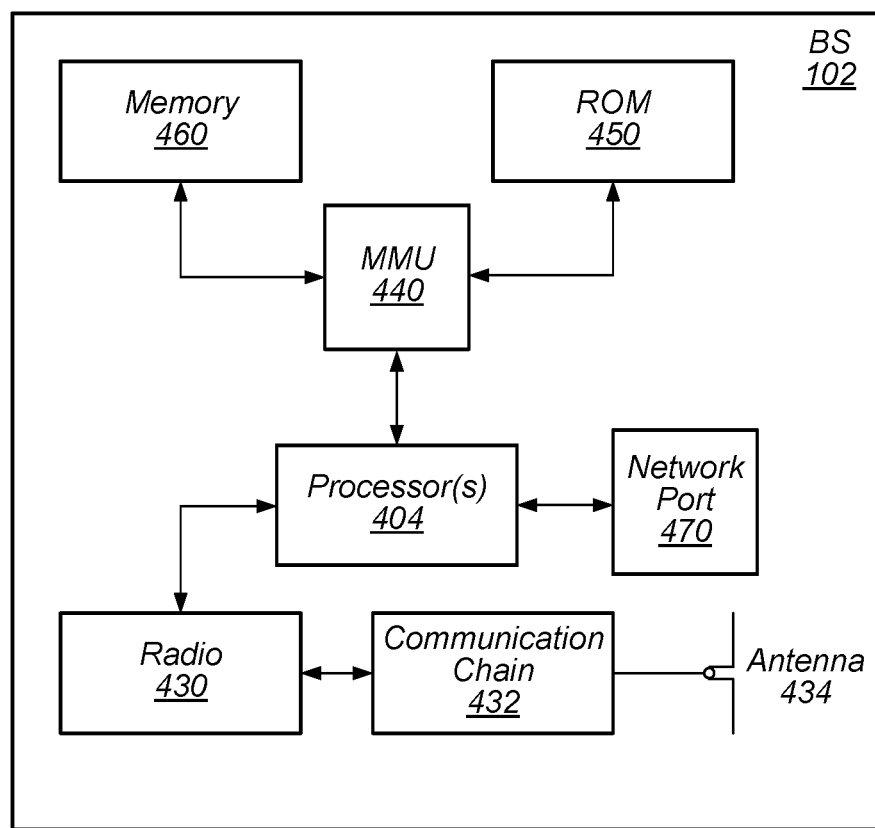
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G-NR) base station, or "gNB". In such embodiments, base station 102 may be connected to a legacy evolved packet core (EPC) network and/or to a NR core (NRC) network. In addition, base station 102 may be considered a 5G-NR cell and may include one or more transmission and reception points (TRPs). In addition, a UE capable of operating according to 5G-NR may be connected to one or more TRPs within one or more gNBs.

The base station 102 may include at least one radio 430, which may be configured to operate as a wireless transceiver and may be further configured to communicate with UE devices 106 via one or more antennas 434. The one or more antennas 434 may include, or constitute, one or more transmission and reception point (TRP). The one or more antennas 434 may include one or more antenna panels and/or one or more antennas of other format(s). For example, in some scenarios, each antenna panel of the one or more antennas 434 may include, or constitute, a respective TRP. The one or more antennas 434 may communicate with the radio 430 via communication chain 432. Communication chain 432 may be a receive chain, a transmit chain or both. In some scenarios, the radio 430 and the communication chain 432 together may be considered a wireless transceiver. The radio 430 may be configured to communicate via various wireless communication standards, including, but not limited to, 5G-NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G-NR radio for performing communication according to 5G-NR. In such a case, the base station 102 may be capable of operating as both an LTE base station and a 5G-NR base station. As another possibility, the base station 102 may include a multi-mode radio which is capable of performing communications according to any of multiple wireless communication technologies (e.g., 5G-NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Communication in Unlicensed Spectrum

Some radio access technologies (RATs) may support cellular communications through unlicensed spectrum bands—i.e. frequency ranges of the electromagnetic spectrum not expressly licensed for use by a cellular communication provider, such as the unlicensed 5 GHz band and the unlicensed 60 GHz band. For example, LTE-A and 5G-NR each accommodate access to unlicensed spectrum. Within 5G-NR, this feature is referred to as NR-based access to Unlicensed Spectrum (NRU).

Some RATs allow use of unlicensed spectrum in a license assisted access (LAA) mode, in which one or more carriers are provided on licensed spectrum, e.g., to carry control information, while other carriers, e.g., to carry payload data, may be provided on unlicensed spectrum.

Additionally, or alternatively, some RATs allow a stand-alone unlicensed mode, in which all signals are transmitted and/or received over unlicensed spectrum. This may be desirable in areas in which licensed spectrum is not available, is congested, etc.

Because unlicensed spectrum is not licensed for a particular use or service provider, all RATs utilizing these frequency ranges should provide for fair coexistence with other RATs. For this reason, RATs operating in unlicensed spectrum may be defined, required, or otherwise encouraged to determine whether a transmission medium is available for transmission prior to transmitting, e.g., by performing listen-before-talk (LBT) using Clear Channel Assessment (CCA) or enhanced CCA ((e)CCA) procedures. Specifically, such a LBT/(e)CCA procedure may include observing whether communications are present on one or more communication media, channels, or frequency ranges for some period of time prior to beginning transmission. Transmission is allowed only if the LBT/(e)CCA procedure is successful, meaning that no other transmission is detected during the observation period and the transmission medium is therefore available for transmission.

For some RATs and/or some modes, timing synchronization may be required between a UE and a BS (e.g., gNB). For example, Synchronization Signal Blocks (SSBs) may be transmitted by the BS for UEs to assess the unlicensed bandwidths and achieve timing synchronization. However, if the operation of the RAT in the unlicensed spectrum also dictates that LBT/(e)CCA be performed prior to transmission, then transmission of SSB may fail, if LBT/(e)CCA indicates that the communication channel is busy.

Additionally, any RAT allowing access to unlicensed spectrum should also fulfill regulatory requirements from global standards. For example, a RAT should comply with global regulatory requirement regarding Occupied Channel Bandwidth (OCB). For example, in the unlicensed 5 GHz band, current global standards dictate that the OCB (i.e., the bandwidth containing 99% of the power of the signal) be between 80% and 100% of the Nominal Channel Bandwidth (NCB) (i.e., the carrier bandwidth defined by the RAT). See ETSI EN 301 893 V2.1.1, Harmonized European Standard, 5 GHz RLAN (2017 May). For the unlicensed 60 GHz bands, current global standards dictate that the OCB be more than 70% of the NCB. See ETSI EN 302 567 V2.1.1, Harmonized European Standard, Multiple-Gigabit/s radio equipment operating in the 60 GHz band (2017 July).

Figure 5:
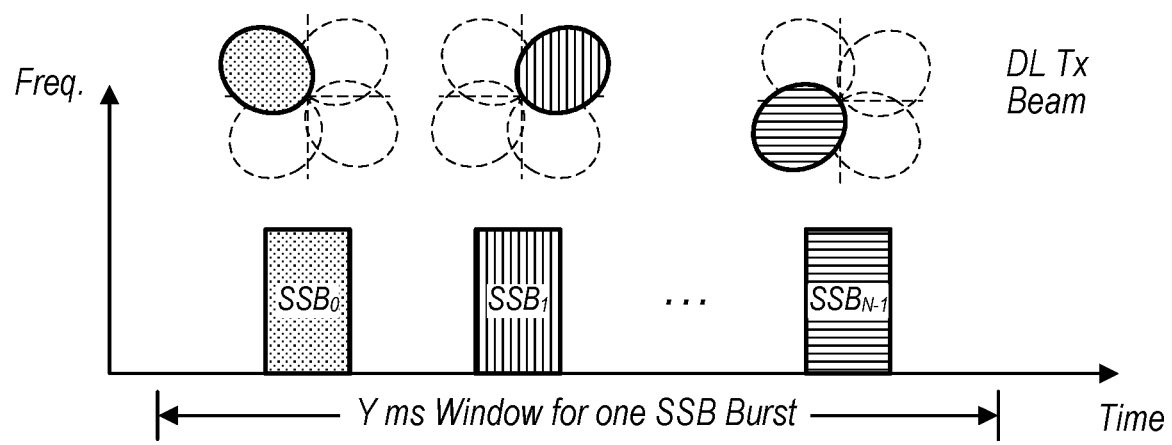
FIG. 5 illustrates an example scheme for a simple SSB burst for time synchronization, according to some embodiments.

FIG. 5—Simple SSB Burst

FIG. 5 illustrates an example scheme for a simple SSB burst for time synchronization, according to some embodiments. Specifically, FIG. 5 illustrates a frequency/time graph of a plurality of SSBs transmitted from a BS, such as BS 102, to one or more UEs, such as UE 106. FIG. 5 further illustrates that each SSB may be transmitted according to one of one or more available beamforming configurations.

A plurality of N SSBs may be transmitted in a burst within a Y ms burst window (e.g., a 5 ms window) and may be repeated every X ms (e.g., every 20 ms). The number, N, of SSBs in each burst and the exact location within the burst window may depend on the Sub-Carrier Species (SCS) and the Frequency Range (FR) used. For example, for a 15 kHz SCS, with FR between 3 GHz and 6 GHz (e.g., within the 5 GHz band), N may be set to 8 SSBs, and may be located at symbols 2 and 8 of the first 4 slots of the burst window. Other values of N are also envisioned, and may be lower (such as 4) or higher (such as 64).

Each SSB may contain timing synchronization information such as, e.g., a Primary Synchronization Signal (PSS), a Secondary Synchronization Signal (SSS), Physical Broadcast Channel (PBCH), and/or Demodulation Reference Signal (DMRS). In some scenarios, each SSB may be transmitted with a different beamforming configuration. Thus, two major functions of an SSB are timing synchronization and beamforming tracking.

Figure 6:
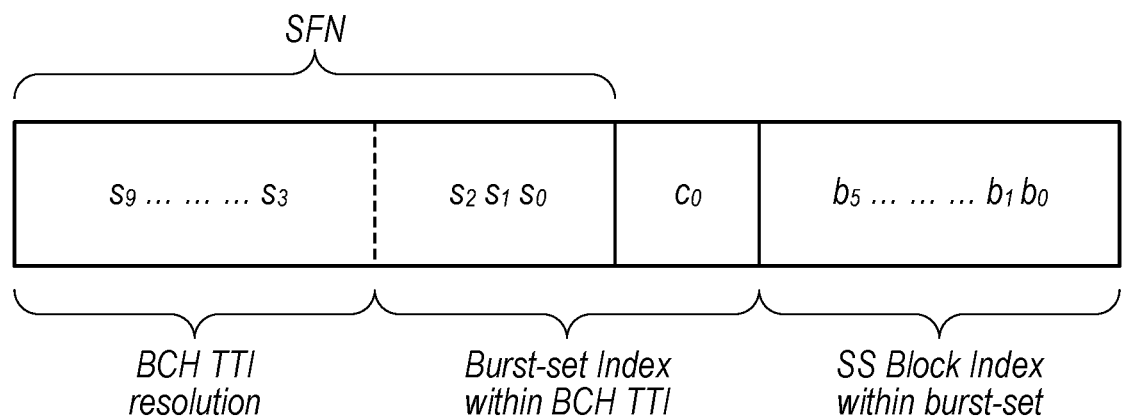
FIG. 6 illustrates identification information of an SSB, according to some embodiments.

Timing indication may be carried in each SSB. For example, each SSB may be identified by a respective scrambling code, based on cell ID and SSB index. FIG. 6 illustrates example identification information of an SSB, according to some embodiments. As illustrated in FIG. 6, the identification information may include a plurality of bits identifying Broadcast Channel (BCH) Transmission Time Interval (TTI), a plurality of bits identifying a SSB burst within the BCH TTI, and a plurality of bits identifying the SSB within the burst. The plurality of bits identifying the SSB within the burst may be referred to as a SSB index.

For each SSB, the symbols in the frequency domain may be scrambled, which may be accomplished, e.g., by taking a dot-product of the symbols with a coding sequence. The coding sequence may be generated based on both the cell ID and at least a portion of the SSB index of the SSB. For example, if N=8, then the coding sequence may be generated based on the 3 least-significant bits (LSB) of the SSB index, which allows for unique identification of each of the 8 SSBs in the SSB burst. More generally, the coding sequence may be generated based on enough bits of the SSB index to uniquely identify one of the N SSBs in the SSB burst. Thus, the UE 106 may identify which SSB has been received by determining which coding sequence (e.g., a coding sequence containing a portion of which SSB index) successfully decodes the SSB. Remaining bits of the timing information not included in the coding sequence may be carried explicitly, e.g., in the PBCH payload within the SSB.

FIG. 5 illustrates transmission of N SSBs in a single SSB burst. As illustrated, each SSB may occur at a respective time instance within the SSB burst, each time instance having a time index T having a value from 0 to N−1. For example, FIG. 5 illustrates $SSB_T$ in a first time instance with T=0, at a second time instance with T=1, and at a final time instance with T=N−1. Thus, determining which SSB has been received, e.g., by identifying the portion of the SSB index used in generating the scrambling code, also identifies the time instance in which the SSB was received. This may allow the UE 106 to perform time synchronization with the BS 102, e.g., by determining the start time of the SSB burst window based on the time of receipt of the SSB and the determined time instance in which the SSB was received. Each time instance may include a known (e.g., fixed) window of time, which may be at least sufficient to perform LBT/(e)CCA procedures and to transmit a SSB.

Each SSB block may be have a 1-to-1 association with a respective Remaining Minimum System Information (RMSI), which may include additional control and/or payload data, such as, e.g., Physical Downlink Shared Channel (PDSCH) and/or Control Result Set (CORESET), which may include Physical Downlink Control Channel (PDCCH). Each RMSI may be transmitted at the same time as the respective SSB (e.g., within a different frequency range) or during some other (e.g., nearby or overlapping) time window.

According to the scheme of FIG. 5, the UE 106 may perform time synchronization with the BS 102. However, this scheme has certain limitations. For example, a single SSB transmitted within a time instance of the SSB burst may occupy insufficient bandwidth to comply with OCB requirements.

Additionally, the scheme of FIG. 5 is susceptible to disruption due to LBT/(e)CCA failure. For example, the BS 102 may perform LBT/(e)CCA procedures prior to any transmission, e.g., if this scheme is used in an unlicensed spectrum band. This means that the BS 102 may perform LBT/(e)CCA procedures prior to transmission of each SSB at its respective time instance. If LBT/(e)CCA fails for a given SSB, then the BS 102 may not transmit, and that SSB may be omitted from the burst. Because each SSB may be transmitted with a distinct beamforming configuration, UE 106 may, in some circumstances, be unable to detect one or more of the SSBs transmitted in a burst, if the UE 106 is located outside the beam of the SSB. Thus, if one or more of the SSBs are omitted from a burst due to LBT/(e)CCA failure, then there is a risk that the UE 106 may be unable to detect any of the remaining SSBs, which would result in failure of the UE 106 to perform time synchronization with the BS 102 during that SSB burst. Given that the probability of successful LBT/(e)CCA is P, the probability of all N SSBs being transmitted in a given SSB burst is $P^N$. Thus, as P becomes small (e.g., due to congestion of the medium) and/or as N becomes large, successful time synchronization for all UEs in the system may become unlikely.

Figure 7:
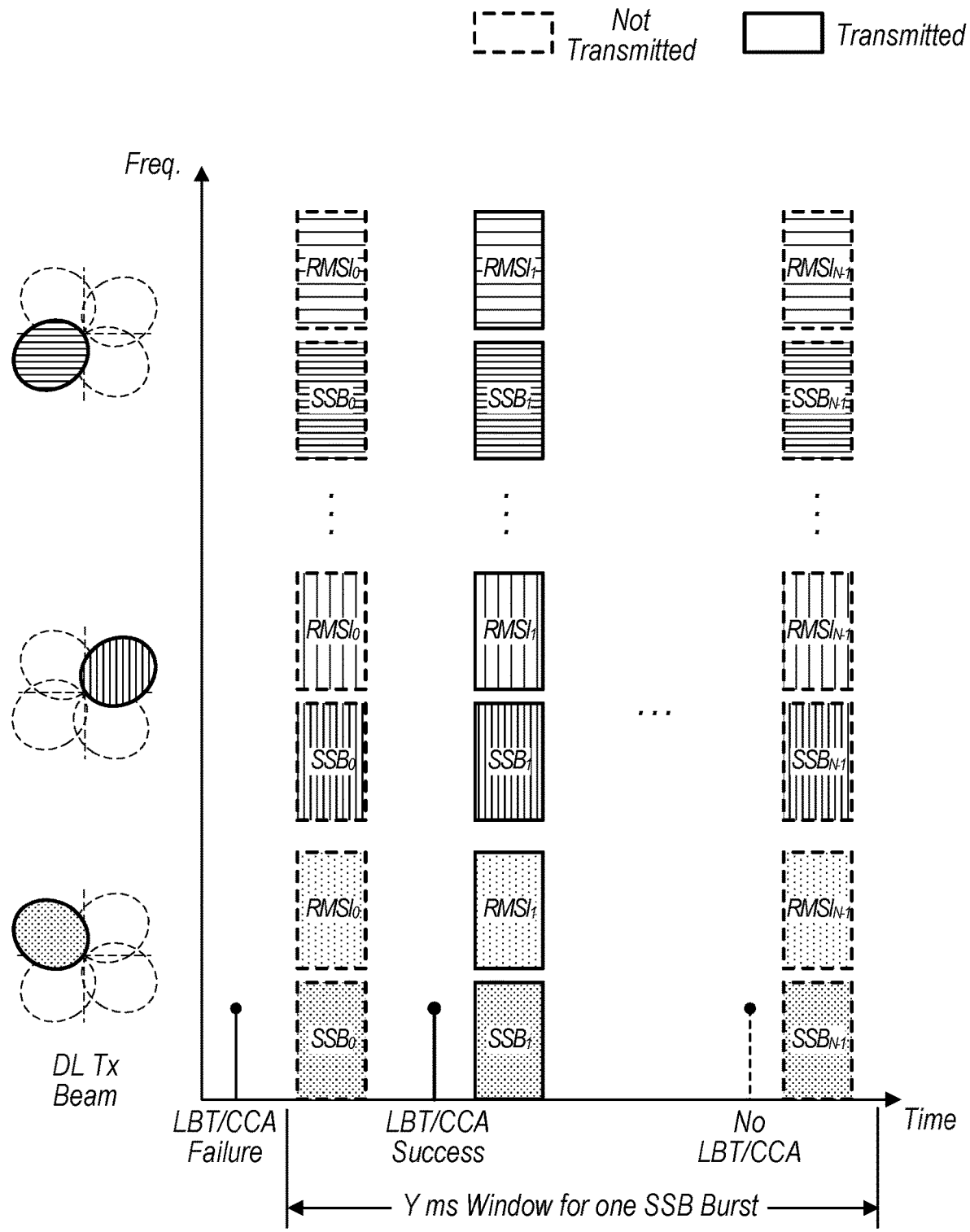
FIG. 7 illustrates an example scheme for a duplicated SSB burst for time synchronization for standalone access to unlicensed spectrum, according to some embodiments.

FIG. 7—Duplicated SSB Burst in Unlicensed Spectrum

FIG. 7 illustrates an alternative example scheme for a duplicated SSB burst for time synchronization for standalone access to unlicensed spectrum, according to some embodiments. Specifically, FIG. 7 illustrates a frequency/time graph of a plurality of SSBs transmitted from a BS, such as BS 102 to one or more UEs, such as UE 106. FIG. 7 further illustrates that each SSB may be transmitted according to each of a plurality of available beamforming configurations.

As in FIG. 5, a plurality of N SSBs may be transmitted in a burst within a Y ms burst window (e.g., a 5 ms window) and may be repeated every X ms (e.g., every 20 ms). However, in a duplicated SSB burst, each SSB and its associated RMSI may be paired and duplicated in the frequency domain at least M times, i.e., using Frequency Domain Multiplexing (FDM) association, and transmitted within a single time instance.

In some scenarios, each copy of the SSB/RMSI pair transmitted within the time instance may be transmitted with a distinct beamforming configuration, e.g., from a respective transmission and reception point (TRP) (e.g., a respective antenna panel). Thus, in some scenarios, M may be defined to be equal to (or in some scenarios less than) the number of TRPs available at the BS 102.

In some scenarios, M may be defined (or determined) such that the total bandwidth of the M SSB/RMSI pairs satisfies OCB regulatory requirements. For example, M might be less than the number of TRPs available at the BS 102 if defining M to be equal to the number of available TRPs would cause the total bandwidth of the M SSB/RMSI pairs to exceed NCB. Thus, in some scenarios, M may be defined (or determined) as a number that is the lesser of (1) the maximum number of TRPs available at the BS 102 or (2) the maximum number of duplicates that would not cause the total bandwidth of the M SSM/RMSI pairs to exceed NCB. Smaller values of M may also be utilized in some scenarios.

In some scenarios, the SSB/RMSI pairs may be duplicated more than M times within the single time instance. For example, if the total bandwidth of the M SSB/RMSI pairs falls short of the required OCB, then some or all of the M SSB/RMSI pairs may be further duplicated. For example, multiple copies of the SSB/RMSI pair may be transmitted according to one or more of the available beamforming configurations.

In addition to allowing better compliance with OCB requirements, this duplicated SSB burst scheme may also increase the probability of the UE 106 successfully performing timing synchronization by receiving at least one SSB, relative to the simple SSB burst scheme illustrated in FIG. 5. For example, as noted above, the UE 106 may fail to observe an SSB transmitted according to certain beamforming configurations if the UE 102 is located outside the beam. Thus, to ensure successful timing synchronization according to the simple SSB burst scheme illustrated in FIG. 5, all SSBs should be transmitted. However, because the duplicated SSB burst scheme illustrated in FIG. 7 transmits each SSB according to multiple (e.g., all) available beamforming configurations, each transmitted SSB may be transmitted according to a beamforming configuration observable by the UE 106.

As in the simple SSB burst scheme of FIG. 5, determining which SSB has been received, e.g., by identifying the portion of the SSB index used in generating the scrambling code, also identifies the time instance in which the SSB was received. This may allow the UE 106 to perform time synchronization with the BS 102, e.g., by determining the start time of the SSB burst window based on the time of receipt of the SSB and the determined time instance in which the SSB was received. Thus, successful timing synchronization according to the duplicated SSB burst scheme illustrated in FIG. 7 may be ensured with as few as one SSB transmitted.

For example, in the scenario illustrated in FIG. 7, the BS 102 performs LBT/(e)CCA procedures prior to transmitting at the first time instance (T=0). In the scenario illustrated in FIG. 7, LBT/(e)CCA fails, causing the BS 102 to not transmit during the first time instance. Thus, $SSB_0$ and $RMSI_0$ are not transmitted in the current SSB burst window.

At the second time instance (T=1), the BS 102 again performs LBT/(e)CCA, which succeeds. In response, the BS 102 transmits, at the second time instance, at least M copies of $SSB_1$ and $RMSI_1$, duplicated in the frequency domain. If LBT/(e)CCA had failed at the second time instance, then the BS 102 would have foregone transmission of $SSB_1$ and $RMSI_1$, and continued performing LBT/(e)CCA at each time instance until LBT/(e)CCA succeeded or the SSB burst window ended.

Once the BS 102 successfully transmits at one of the time instances, it may either continue attempting to transmit additional SSB/RMSI pairs at subsequent time instances or forego additional LBT/(e)CCA performance and transmission for the remainder of the SSB burst window, as the UE 106 may be able to successfully perform timing synchronization based on any one transmitted SSB.

Assuming LBT/(e)CCA success probability is P, the probability of one successful transmission within the SSB burst window is $1-(1-P)^N$, which is always equal to or greater than $P^N$. As N becomes large or P becomes small, $1-(1-P)^N >> P^N$.

Relatedly, this duplicated SSB burst scheme may also decrease channel occupancy time relative to the simple SSB burst scheme illustrated in FIG. 5. For example, if the BS 102 foregoes additional LBT/(e)CCA performance and transmission for the remainder of the SSB burst window following transmission in one time instance, then sufficient SSB/RMSI information may be sent using only four symbols of the SSB burst window. Not only does this decreased channel occupancy alleviate congestion within the unlicensed spectrum, but it may also allow improvements in the SSB process as defined by relevant standards outlining RAT protocols (e.g., 5G-NR). For example, with such a low channel occupancy, it may be feasible to define a RAT protocol to allow SSB transmission according to a higher priority LBT category, such as a category that allows fixed (as opposed to random) backoff timing. Thus, in some scenarios, the method illustrated in FIG. 7 may be performed with fixed backoff timing. In other scenarios, the method may be performed with random backoff timing.

Thus, the duplicated SSB burst scheme of FIG. 7 may provide multiple advantages over the simple SSB burst scheme illustrated in FIG. 5, with very little increase in complexity.

However, the duplicated SSB burst scheme may also have certain limitations. For example, although the time index of a received SSB may be determined, the UE 106 may be unable to determine the frequency position of the received SSB within the SSB burst window, because the same SSB/RMSI information is repeated at multiple positions in the frequency domain. Specifically, because each copy of the SSB/RMSI pair may be sent with a different beamforming configuration, the UE 106 may receive one copy with greater signal strength than other copies. The UE 106 may thus detect energy on the channel and receive that SSB, but may be unable to determine where that received SSB falls within the frequency range of the SSB burst window. Thus, with the duplicated SSB burst scheme of FIG. 7, the UE 106 may be unable to perform beamforming tracking based on SSB.

However, this limitation may, in some scenarios, be mitigated by providing information in other messages, such as RRC messages, to allow identification of frequency domain location. For example, an RRC message may indicate how many times an SSB has been repeated in the frequency domain, and the beamforming associated with each repetition. More generally, beamforming tracking may be performed using an aperiodic CSI-RS approach, instead of depending on SSB.

Figure 8:
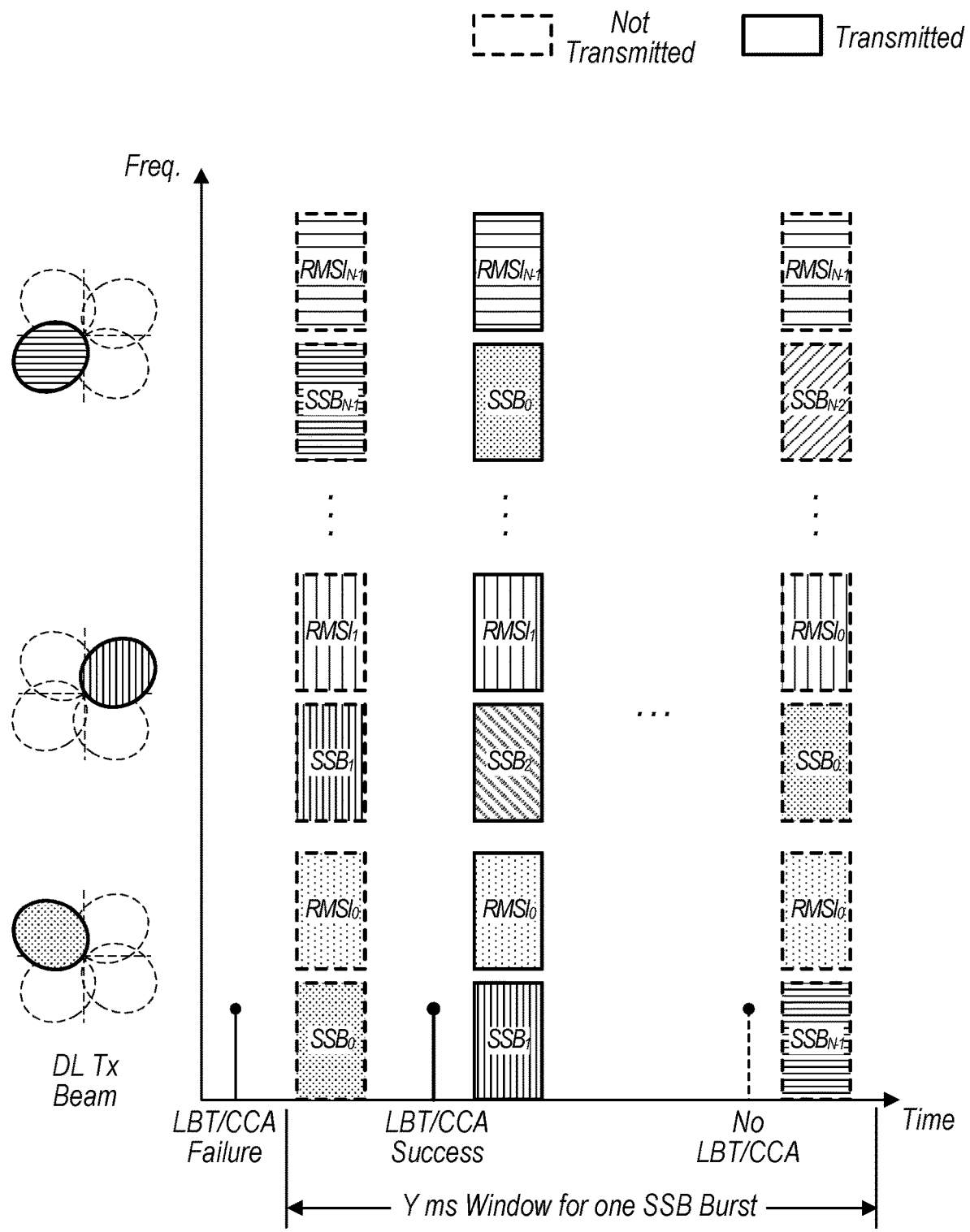
FIG. 8 illustrates an example scheme for a stacked SSB burst for time synchronization for standalone access to unlicensed spectrum, according to some embodiments.

FIG. 8—Stacked SSB Burst in Unlicensed Spectrum

FIG. 8 illustrates an alternative example scheme for a stacked SSB burst for time synchronization for standalone access to unlicensed spectrum, according to some embodiments. Specifically, FIG. 8 illustrates a frequency/time graph of a plurality of SSBs transmitted from a BS, such as BS 102 to one or more UEs, such as UE 106. FIG. 8 further illustrates that each SSB may be transmitted according to one of one or more available beamforming configurations.

As in FIG. 5, a plurality of N SSBs may be transmitted in a burst within a Y ms burst window (e.g., a 5 ms window) and may be repeated every X ms (e.g., every 20 ms). However, in a stacked SSB burst, M SSBs and their associated RMSIs may be stacked in the frequency domain, i.e., using Frequency Domain Multiplexing (FDM) association, and transmitted within a single time instance. Each SSB/RMSI pair transmitted within the time instance may be transmitted with a distinct beamforming configuration, e.g., from a respective TRP. Thus, M may be defined as equal to (or in some scenarios less than) the number of TRPs available at the BS 102.

With the SSBs stacked in groups of M, each group may be allocated M time instances for transmission within each SSB burst window. The group may be transmitted using at most one of the allocated time instances.

FIG. 8 illustrates an example of a stacked SSB burst in which M=N. In this scenario, all N SSBs may be transmitted in a single time instance. This transmission may therefore occur during any of the N time instances of the SSB burst window. This may provide improved accommodation of LBT/(e)CCA failure relative to the simple SSB Burst scheme illustrated in FIG. 5. Specifically, as in the duplicated SSB burst scheme illustrated in FIG. 7, the stacked SSB burst scheme provides, in each time instance, SSBs transmitted according to multiple (e.g., all) available beamforming configurations, such that each time instance may include an SSB transmitted according to a beamforming configuration observable by the UE 106.

For example, the BS 102 performs LBT/(e)CCA procedures prior to transmitting at the first time instance (T=0). In the scenario illustrated in FIG. 8, LBT/(e)CCA fails, causing the BS 102 to not transmit during the first time instance. At the second time instance (T=1), the BS 102 again performs LBT/(e)CCA, which succeeds. In response, the BS 102 transmits, at the second time instance, all N SSBs and their associated RMSIs, stacked in the frequency domain. If LBT/(e)CCA had failed at the second time instance, then the BS 102 would have continued performing LBT/(e)CCA at each time instance until LBT/(e)CCA succeeded or the SSB burst window ended. The BS 102 would transmit the N SSBs and their associated RMSIs in response to the first successful LBT/(e)CCA.

Once the SSBs and RMSIs have been transmitted, no further transmission is necessary during the remainder of the SSB burst window. Thus, in some circumstances, the BS 102 may forego further LBT/(e)CCA performance and transmission for the remaining time instances.

Because only one successful transmission per SSB burst window is necessary in this scenario, the likelihood of successfully transmitting the relevant SSB may be significantly improved, relative to the simple SSB Burst scheme illustrated in FIG. 5. Specifically, assuming LBT/(e)CCA success probability is P, the probability of one successful transmission within the SSB burst window is $1-(1-P)^N$, which is always equal to or greater than $P^N$. As N becomes large or P becomes small, $1-(1-P)^N \gg P^N$.

In other scenarios, M may be less than N, e.g., because the BS 102 has less than N available TRPs. In such scenarios, the N time instances of the SSB burst window may be divided into groups of M time instances, with a stack of M SSBs (and their associated RMSIs) transmitted within at most one of the M time instances within each group. For example, if N=8 and M=2, then the SSB burst window may be divided into four groups of 2 time instances. In the first time instance of the first group (T=0), the BS 102 may perform LBT/(e)CCA. If LBT/(e)CCA is successful, the BS 102 may transmit two (e.g., the first and second) SSBs and their associated RMSIs, stacked in the frequency domain, within the first time instance, and may, in some scenarios, forego LBT/(e)CCA for the remaining time instances of the first group. If LBT/(e)CCA is not successful, the BS 102 may forego transmission during the first time instance, and may perform LBT/(e)CCA again during the second time instance of the first group (T=1).

If LBT/(e)CCA is successful during the second time instance, the BS 102 may transmit two (e.g., the first and second) SSBs and their associated RMSIs, stacked in the frequency domain, within the second time instance. If LBT/(e)CCA is not successful at the second time instance, the BS 102 may forego transmission during the second time instance. Because the first group of time instances includes only two time instances, this would result in the first two SSBs and their associated RMSIs not being transmitted within the current SSB burst.

In some scenarios, regardless of whether the first two SSBs were transmitted during the first group of time instances, the BS 102 may, in the first time instance of the second group (T=2), again perform LBT/(e)CCA. If LBT/(e)CCA is successful, the BS 102 may transmit two (e.g., the third and fourth) SSBs and their associated RMSIs, stacked in the frequency domain, within the third time instance. If LBT/(e)CCA is not successful, the BS 102 may forego transmission during the first time instance of the second group, and perform LBT/(e)CCA again during the second time instance of the second group (T=3). If LBT/(e)CCA is successful during the second time instance, the BS 102 may transmit two (e.g., the third and fourth) SSBs and their associated RMSIs, stacked in the frequency domain, within the second time instance of the second group. If LBT/(e)CCA is not successful at the second time instance, the BS 102 may forego transmission during the second time instance. Because the second group of time instances includes only two time instances, this would result in the second two SSBs and their associated RMSIs not being transmitted within the current SSB burst.

In some scenarios (e.g., if all available beamforming configurations are represented in each transmission), once a transmission has occurred at any time instance, the BS 102 may forego LBT/(e)CCA and transmission for all remaining time instances of the SSB burst window.

This pattern may be repeated for each of the four groups of time instances. Assuming LBT/(e)CCA success probability is P, the probability of one successful transmission within a given group of M time instances is $1-(1-P)^M$. Thus, assuming M is a factor of N, the probability of transmitting all N SSBs is $(1-(1-P)^M)^{N/M}$, which is always equal to or greater than $P^N$, and becomes $\gg P^N$ as N becomes large or P becomes small. However, if all beamforming configurations are represented in each transmission, then the UE 106 may be assured of observing at least one SSB on any given transmission, which may be sufficient to perform successful timing synchronization. The probability of receiving at least one transmission within the SSB burst window is $1-(1-P)^N$.

In addition to reducing disruption due to LBT/(e)CCA failure, this stacked SSB burst scheme also provides increased occupied bandwidth relative to the simple SSB Burst scheme illustrated in FIG. 5, and may thus satisfy OCB regulatory requirements. However, if the transmission still does not satisfy OCB regulatory requirements, one or more (e.g., all) of the M SSBs and RMSIs to be transmitted in a given time instance may be duplicated one or more times and further stacked in the frequency domain, until their total bandwidth does satisfy OCB regulatory requirements.

Additionally, this stacked SSB burst scheme illustrated in FIG. 8 may also provide an advantage over the duplicated SSB burst scheme illustrated in FIG. 7, by allowing for beamforming tracking. Specifically, as illustrated in FIG. 8, each RMSI may be located at a fixed location in the frequency domain, independent of position in time domain. Because each SSB/RMSI pair transmitted within a particular time instance may be sent with a different beamforming configuration, the UE 106 may receive one SSB/RMSI pair with greater signal strength than other pairs. Once the UE 106 has received the SSB/RMSI pair and determined which SSB/RMSI pair was received (e.g., by determining the SSB index, based on the scrambling code), the UE 106 may unambiguously determine the frequency-domain position of the received RMSI within the SSB burst window. The UE 106 may also have (e.g., the UE 106 may have previously received from the BS 102) information correlating each frequency-domain position within the SSB burst window with a respective beamforming configuration. Thus, based on the determined position of the received RMSI in the frequency domain, the UE 106 may further determine which beamforming configuration was used in transmitting the received RMSI.

However, timing synchronization may be more complex according to the stacked SSB burst scheme of FIG. 8, relative to the preceding schemes. Specifically, because the same M SSBs may be transmitted on any of M time instances, determining the SSB index of a received SSB is not sufficient in this scheme to identify the time instance in which it was received. Therefore, the time instance may be flagged in another manner.

For example, in some scenarios, each SSB may be offset from its associated RMSI in the frequency domain by T positions, T being the time index of the present time instance. This is illustrated in the Example of FIG. 8. Specifically, in the first time instance (T=0), each SSB is positioned adjacent to its respective RMSI in the frequency domain. For example, $SSB_0$ is positioned adjacent to $RMSI_0$. By contrast, in the second time instance (T=1), each SSB is offset from its respective RMSI in the frequency domain by one position, shifting each SSB "downward" one position in the frequency domain. In some scenarios, the offset may be defined as $T*BW_{SSB/RMSI}$, where $BW_{SSB/RMSI}$ is the total BW for one SSB and its RMSI. For example, $SSB_1$ is positioned adjacent to $RMSI_0$, while $SSB_0$ rolls over to be positioned adjacent to $RMSI_{N-1}$. Similarly, in the final time instance (T=N −1), each SSB is offset from its respective RMSI in the frequency domain by N−1 positions. For example, $SSB_{N-1}$ is positioned adjacent to $RMSI_0$.

Thus, in response to receiving a SSB and its associated RMSI, the UE 106 may determine the offset between them in the frequency domain and, based on the determined offset, may further determine the time instance in which the SSB and RMSI were received. This may allow the UE 106 to perform time synchronization with the BS 102, e.g., by determining the start time of the SSB burst window based on the time of receipt of the SSB and the determined time instance in which the SSB was received.

Figure 9:
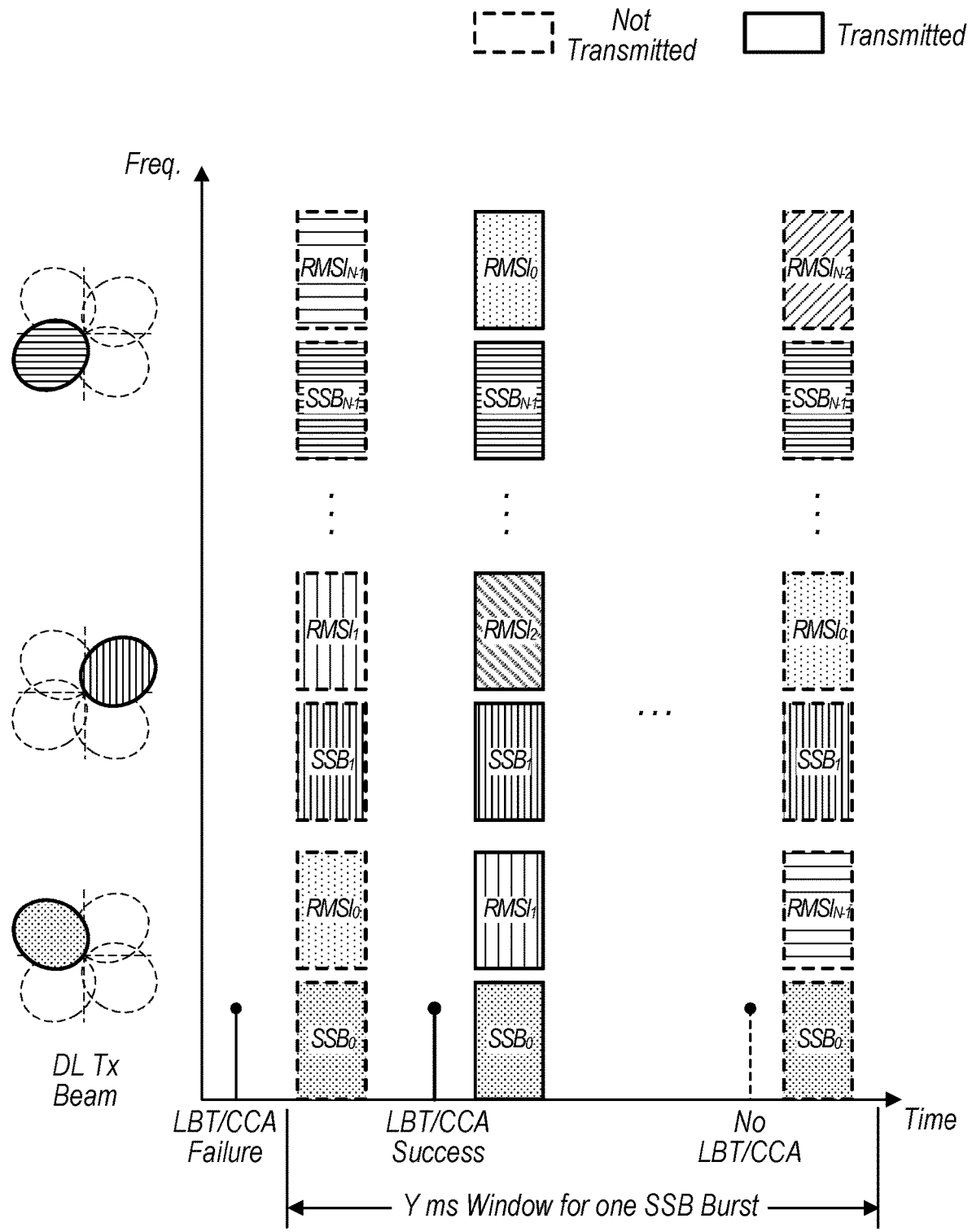
FIG. 9 illustrates an alternative example scheme for a stacked SSB burst for time synchronization for standalone access to unlicensed spectrum, according to some embodiments.

It should be understood that offsetting the SSB from its respective RMSI may alternatively be performed in some other manner, so long as the pattern is known to both the BS 102 and the UE 106. For example, FIG. 9 shows an alternative scenario, in which the SSBs remain fixed in the frequency domain, while the RMSIs are shifted by T positions in the frequency domain. In such a scenario, beamforming tracking may be performed based on the position of the received SSB in the frequency domain, while the time instance may still be determined based on the offset between the received SSB and its associated RMSI.

Example Embodiments

Various embodiments are envisioned, including the following examples.

A wireless communication base station (BS), comprising:
a plurality of transmission and reception points (TRPs);
a wireless transceiver coupled to the plurality of TRPs, the wireless transceiver configured to cause the BS to:
determine whether a transmission medium within an unlicensed spectrum band is available for transmission by the BS during a first time instance of a plurality of time instances within a burst window;
in response to determining that the transmission medium is available for transmission by the BS during the first time instance, transmit, within the first time instance, a first plurality of pairs of information blocks, each pair of information blocks including a synchronization signal block (SSB) and an associated remaining minimum system information (RMSI) block, wherein each of the pairs of information blocks is transmitted according to a distinct beamforming configuration; and
in response to determining that the transmission medium is not available for transmission by the BS during the first time instance, forego transmission of the first plurality of pairs of information blocks during the first time instance, and determine whether the transmission medium is available for transmission by the BS during a second, subsequent time instance of the plurality of time instances within the burst window.

In some instances of the preceding BS, a frequency-domain distance between each SSB and the associated RMSI is a function of a position of the current time instance within the burst window.

In some instances of the preceding BS, each SSB is scheduled for transmission within a same frequency-domain position within a communication channel during each time instance within the burst window, and each RMSI block is scheduled at a different frequency-domain position within the communication channel during each time instance within the burst window.

In some instances of the preceding BS, each RMSI is scheduled for transmission within a same frequency-domain position within a communication channel during each time instance within the burst window, and each SSB block is scheduled at a different frequency-domain position within the communication channel during each time instance within the burst window.

In some instances of the preceding BS, the wireless transceiver is further configured to cause the BS to: in response to determining that the transmission medium is available for transmission by the BS during the second time instance, transmit, within the second time instance, a second plurality of pairs of information blocks, each pair of information blocks including a SSB and an associated RMSI block, wherein each of the pairs of information blocks is transmitted according to a distinct beamforming configuration, wherein the second plurality of pairs of information blocks includes the same set of SSBs and RMSI blocks as the first plurality of pairs of information blocks, but wherein the SSBs and RMSI blocks are paired differently in the second plurality of pairs of information blocks than in the first plurality of pairs of information blocks.

In some instances of the preceding BS, each pair of information blocks is transmitted from a different TRP.

In some instances of the preceding BS, the number of pairs of information blocks transmitted is equal to the number of TRPs of the BS.

A method, comprising:
by a wireless communication base station (BS),
determining whether a transmission medium within an unlicensed spectrum band is available for transmission by the BS during a first time instance of a plurality of time instances within a burst window; and
in response to determining that the transmission medium is available for transmission by the BS during the first time instance, transmitting, within the first time instance, a plurality of pairs of information blocks, each pair of information blocks comprising a synchronization signal block (SSB) and an associated remaining minimum system information (RMSI) block, wherein each of the pairs of information blocks is transmitted according to a distinct beamforming configuration.

The preceding method, wherein a frequency-domain distance between each SSB and the associated RMSI is a function of a position of the current time instance within the burst window.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication base station (BS), comprising:
   a plurality of transmission and reception points (TRPs);
   a wireless transceiver coupled to the plurality of TRPs, the wireless transceiver configured to cause the BS to:
      determine whether a transmission medium within an unlicensed spectrum band is available for transmission by the BS during a first time instance;
      in response to determining that the transmission medium is available for transmission by the BS during the first time instance, transmit a plurality of copies of a first synchronization signal block (SSB), wherein each copy of the first SSB is transmitted within the first time instance but at a different frequency-domain position within a communication channel, wherein each copy of the first SSB is transmitted according to a distinct beamforming configuration; and
      in response to determining that the transmission medium is not available for transmission by the BS during the first time instance, forego transmission of the first SSB during the first time instance, and determine whether the transmission medium is available for transmission by the BS during a second, subsequent time instance;
      wherein the first SSB is included in a plurality of SSBs scheduled for transmission within a SSB burst window, the SSB burst window including at least the first time instance and the second time instance, wherein the wireless transceiver is further configured to cause the BS to:
         in response to transmitting the plurality of copies of the first SSB, forego transmission of the other SSBs of the plurality of SSBs scheduled for transmission within the SSB burst window.

2. The BS of claim 1, wherein the wireless transceiver is further configured to cause the BS to:
   in response to determining that the transmission medium is available for transmission by the BS during the second time instance, transmit a plurality of copies of a second SSB, wherein each copy of the second SSB is transmitted within the second time instance but at a different frequency-domain position within the communication channel, wherein each copy of the second SSB is transmitted according to a distinct beamforming configuration.

3. The BS of claim 1, wherein each copy of the first SSB is transmitted from a different TRP.

4. The BS of claim 3, wherein the number of copies of the first SSB transmitted is equal to the number of TRPs of the BS.

5. The BS of claim 1, wherein the number of copies of the first SSB transmitted is equal to a maximum number of copies that can be transmitted without exceeding nominal channel bandwidth for the communication channel.

6. The BS of claim 1, wherein the wireless transceiver is further configured to cause the BS to:
   in response to determining that the transmission medium is available for transmission by the BS during the first time instance, transmit a plurality of copies of a remaining minimum system information (RMSI) block, wherein each copy of the RMSI block is transmitted within the first time instance but at a different frequency-domain position within the communication channel, wherein each copy of the RMSI block is associated with one of the copies of the SSB and is transmitted according to the beamforming configuration of the associated copy of the SSB.

7. A method, comprising:
   by a wireless communication base station (BS),
      determining whether a transmission medium within an unlicensed spectrum band is available for transmission by the BS during a first time instance; and
      in response to determining that the transmission medium is available for transmission by the BS during the first time instance, transmitting a plurality of copies of a first synchronization signal block (SSB), wherein each copy of the SSB is transmitted within the first time instance but at a different frequency-domain position within a communication channel, wherein each copy of the SSB is transmitted according to a distinct beamforming configuration, wherein the number of copies of the first SSB transmitted is equal to the lesser of:
         a maximum number of copies that can be transmitted without exceeding nominal channel bandwidth for the communication channel; or
         a number of transmission and reception points (TRPs) of the BS.

8. The method of claim 7, further comprising:
   in response to determining that the transmission medium is available for transmission by the BS during the first time instance, further transmitting a plurality of copies of a remaining minimum system information (RMSI) block, wherein each copy of the RMSI block is transmitted within the first time instance but at a different frequency-domain position within the communication channel, wherein each copy of the RMSI block is associated with one of the copies of the SSB and is transmitted according to the beamforming configuration of the associated copy of the SSB.

9. The method of claim 7, further comprising:
determining, during a second time instance, prior to the first time instance, whether the transmission medium is available for transmission by the BS; and
in response to determining that the transmission medium is not available for transmission by the BS during the second time instance, foregoing transmission of a second SSB during the second time instance and determining whether the transmission medium is available for transmission by the BS during the first time instance.

10. The method of claim 7, further comprising:
in response to transmitting the plurality of copies of the first SSB during the first time instance, foregoing determining whether the transmission medium is available for transmission by the BS during a third time instance, subsequent to the first time instance.

11. The method of claim 7, further comprising:
in response to transmitting the plurality of copies of the first SSB during the first time instance, foregoing transmission of a second SSB during a third time instance, subsequent to the first time instance.

12. The method of claim 7, wherein each copy of the first SSB is transmitted from a different transmission and reception point (TRP) of the BS.

13. An apparatus for use in a wireless communication base station (BS), the apparatus comprising:
a memory storing software instructions;
a processor configured to execute the software instructions to cause the apparatus to:
determine whether a transmission medium within an unlicensed spectrum band is available for transmission by the BS during a first time instance;
in response to determining that the transmission medium is available for transmission by the BS during the first time instance, cause the BS to transmit a plurality of copies of a first synchronization signal block (SSB), wherein each copy of the first SSB is transmitted within the first time instance but at a different frequency-domain position within a communication channel, wherein the number of copies of the first SSB transmitted is at least equal to a minimum number of copies needed to achieve a minimum occupied channel bandwidth value for the communication channel, as defined for a radio access technology according to which the plurality of copies of the first SSB is transmitted; and
in response to determining that the transmission medium is not available for transmission by the BS during the first time instance, cause the BS to forego transmission of the first SSB during the first time instance, and determine whether a transmission medium is available for transmission by the BS during a second, subsequent time instance.

14. The apparatus of claim 13, wherein executing the software instructions further causes the apparatus to:
in response to determining that the transmission medium is available for transmission by the BS during the second time instance, cause the BS to transmit a plurality of copies of a second SSB, wherein each copy of the second SSB is transmitted within the second time instance but at a different frequency-domain position within the communication channel.

15. The apparatus of claim 13, wherein at least one copy of the first SSB is transmitted according to a first beamforming configuration, and at least one copy of the first SSB is transmitted according to a second beamforming configuration.

16. The apparatus of claim 13, wherein at least one copy of the first SSB is transmitted from each transmission and reception point (TRP) of the BS.

17. The apparatus of claim 13, wherein executing the software instructions further causes the apparatus to:
in response to determining that the transmission medium is available for transmission by the BS during the first time instance, cause the BS to transmit a plurality of copies of a remaining minimum system information (RMSI) block, wherein each copy of the RMSI block is transmitted within the first time instance but at a different frequency-domain position within the communication channel, wherein each copy of the RMSI block is associated with one of the copies of the SSB and is transmitted according to a same beamforming configuration as the associated copy of the SSB.

* * * * *